United States Patent
Lingelbach et al.

(10) Patent No.: US 10,132,528 B2
(45) Date of Patent: *Nov. 20, 2018

(54) REFRIGERATION SYSTEM AND METHODS FOR REFRIGERATION

(71) Applicant: ARESCO TECHNOLOGIES, LLC, Omaha, NE (US)

(72) Inventors: Fred Lingelbach, Elkhorn, NE (US); John Lingelbach, Elkhorn, NE (US)

(73) Assignee: ARESCO Technologies, LLC, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,031

(22) Filed: Nov. 29, 2016

(65) Prior Publication Data
US 2017/0176054 A1    Jun. 22, 2017

Related U.S. Application Data

(63) Continuation of application No. 13/495,468, filed on Jun. 13, 2012, now Pat. No. 9,513,033.
(Continued)

(51) Int. Cl.
F25B 1/00    (2006.01)
F25B 1/10    (2006.01)
(Continued)

(52) U.S. Cl.
CPC ............... *F25B 1/10* (2013.01); *F25B 5/02* (2013.01); *F25B 6/02* (2013.01); *F25B 9/002* (2013.01);
(Continued)

(58) Field of Classification Search
CPC ........ F25B 1/10; F25B 43/006; F25B 47/022; F25B 9/002; F25B 5/02; F25B 6/02;
(Continued)

(56) References Cited

U.S. PATENT DOCUMENTS 1,977,054 A    10/1934    Giles
2,003,310 A    6/1935    Rexwinkle
(Continued)

FOREIGN PATENT DOCUMENTS

AU    2012271769    2/2016
AU    2012271757    7/2016
(Continued)

OTHER PUBLICATIONS

"Refrigeration Principle and Apparatus", Zhen Xiande, China Machine Press issued Jan. 31, 2001, pp. 70-72.
(Continued)

*Primary Examiner* — Emmanuel Duke
(74) *Attorney, Agent, or Firm* — Merchant & Gould P.C.

(57) ABSTRACT

A refrigeration system includes: a compressor arrangement for compressing gaseous refrigerant from a first pressure to a second pressure, wherein the second pressure comprises a condensing pressure; a plurality of condenser evaporator systems, wherein each condenser evaporator system comprises: (1) a condenser for receiving gaseous refrigerant at a condensing pressure and condensing the refrigerant to a liquid refrigerant; (2) a controlled pressure receiver for holding the liquid refrigerant from the condenser; and (3) an evaporator for evaporating liquid refrigerant from the controlled pressure receiver to form gaseous refrigerant; a first gaseous refrigerant feed line for feeding the gaseous refrigerant at the second pressure from the compressor arrangement to the plurality of condenser evaporator systems; and a second gaseous refrigerant feed line for feeding gaseous refrigerant from the plurality of condenser evaporator systems to the compressor arrangement.

22 Claims, 4 Drawing Sheets

Related U.S. Application Data (60) Provisional application No. 61/496,160, filed on Jun. 13, 2011.

(51) Int. Cl.
| | | |
|---|---|---|
| *F25B 5/02* | (2006.01) | |
| *F25B 6/02* | (2006.01) | |
| *F25B 9/00* | (2006.01) | |
| *F25B 47/02* | (2006.01) | |
| *F25B 43/00* | (2006.01) | |

(52) U.S. Cl.
CPC .......... *F25B 43/006* (2013.01); *F25B 47/022* (2013.01); *F25B 2400/06* (2013.01); *F25B 2400/072* (2013.01); *F25B 2400/16* (2013.01); *F25B 2400/161* (2013.01)

(58) Field of Classification Search
CPC ............ F25B 2400/161; F25B 2400/06; F25B 2400/16; F25B 2400/072; F25B 1/00; F25B 41/00; F25D 21/06; F02B 5/00
See application file for complete search history.

(56) References Cited

U.S. PATENT DOCUMENTS

| | | | |
|---|---|---|---|
| 2,290,711 A | | 7/1942 | Robinson et al. |
| 2,336,097 A | | 12/1943 | Hutchinson |
| 2,487,001 A | | 11/1949 | Taylor et al. |
| 2,530,681 A | * | 11/1950 | Clancy .................... F25B 13/00 62/324.1 |
| 3,041,854 A | | 7/1962 | Arganbright et al. |
| 3,184,926 A | * | 5/1965 | Blake ........................ F25B 1/10 62/155 |
| 3,300,993 A | | 1/1967 | Schlemmer |
| 3,353,367 A | | 11/1967 | Garland et al. |
| 3,852,974 A | * | 12/1974 | Brown ....................... F25B 1/00 62/175 |
| 3,919,859 A | | 11/1975 | Ross |
| 3,939,668 A | | 2/1976 | Morris |
| 4,151,724 A | * | 5/1979 | Garland ..................... F25B 1/00 62/175 |
| 4,210,001 A | | 7/1980 | Miller, Sr. |
| 4,315,404 A | | 2/1982 | Schmitt et al. |
| 4,484,453 A | | 11/1984 | Niess |
| 4,763,488 A | | 8/1988 | Johnston |
| 5,189,885 A | | 3/1993 | Ni |
| 5,279,131 A | | 1/1994 | Urushihata et al. |
| 5,413,728 A | | 5/1995 | Mall et al. |
| 5,435,149 A | | 7/1995 | Strong et al. |
| 5,546,757 A | | 8/1996 | Whipple, III |
| 5,626,025 A | | 5/1997 | Hyde |
| 5,660,047 A | | 8/1997 | Paganessi |
| 5,669,222 A | | 9/1997 | Jaster et al. |
| 5,671,607 A | | 9/1997 | Clemens et al. |
| 6,018,956 A | | 2/2000 | Sakata et al. |
| 6,018,958 A | * | 2/2000 | Lingelbach ............... F25B 1/00 62/119 |
| 6,070,426 A | | 6/2000 | Sakashita et al. |
| 6,094,925 A | * | 8/2000 | Arshansky ............ F25B 25/005 62/151 |
| 6,170,270 B1 | | 1/2001 | Arshansky et al. |
| 6,349,564 B1 | * | 2/2002 | Lingelbach ............... F25B 1/10 62/503 |
| 6,467,301 B1 | | 10/2002 | Lingelbach et al. |
| 6,467,302 B1 | | 10/2002 | Lingelbach et al. |
| 7,082,774 B2 | | 8/2006 | Ayub |
| 7,178,356 B1 | | 2/2007 | Lingelbach et al. |
| 7,823,413 B2 | | 11/2010 | Beving et al. |
| 8,544,283 B2 | | 10/2013 | Lingelbach et al. |
| 9,335,085 B2 | | 5/2016 | Lingelbach et al. |
| 9,513,033 B2 | | 12/2016 | Lingelbach et al. |
| 2001/0023594 A1 | | 9/2001 | Ives |
| 2006/0107671 A1 | | 5/2006 | Yoshida et al. |
| 2007/0234753 A1 | | 10/2007 | Nemoto et al. |
| 2008/0060365 A1 | | 3/2008 | Sakitani et al. |
| 2008/0184724 A1 | | 8/2008 | Jagusztyn |
| 2008/0223074 A1 | | 9/2008 | Pachai et al. |
| 2009/0165482 A1 | | 7/2009 | Ko et al. |
| 2009/0282849 A1 | | 11/2009 | Fujimoto et al. |
| 2009/0301112 A1 | | 12/2009 | Nelson |
| 2010/0037645 A1 | | 2/2010 | Cieslik et al. |
| 2010/0205984 A1 | | 8/2010 | Gu et al. |
| 2012/0312033 A1 | | 12/2012 | Lingelbach et al. |
| 2012/0312038 A1 | | 12/2012 | Lingelbach et al. |
| 2014/0157801 A1 | | 6/2014 | Lingelbach et al. |

FOREIGN PATENT DOCUMENTS

| | | |
|---|---|---|
| CN | 1100194 A | 3/1995 |
| CN | 101317046 A | 12/2008 |
| CN | 101476791 A | 7/2009 |
| EP | 0 931 993 A1 | 7/1999 |
| EP | 1 134 514 A1 | 9/2001 |
| EP | 1 795 836 A1 | 6/2007 |
| EP | 2 068 094 A1 | 6/2009 |
| EP | 2 077 427 A1 | 7/2009 |
| GB | 2248494 A | 4/1992 |
| JP | 2001-235245 | 8/2001 |
| JP | 2002-318039 | 10/2002 |
| JP | 2005-283064 | 10/2005 |
| JP | 2006-336971 | 12/2006 |
| JP | 2007-205634 | 8/2007 |
| JP | 2008-051495 | 3/2008 |
| JP | 2004-184019 | 7/2014 |
| WO | WO 1995/30117 A1 | 11/1995 |
| WO | WO 2008/032578 A1 | 3/2008 |
| WO | WO 2008/112554 A1 | 9/2008 |
| WO | WO 2008/112566 A2 | 9/2008 |
| WO | WO 2008/112572 A1 | 9/2008 |
| WO | WO 2008/112591 A2 | 9/2008 |
| WO | WO 2009/109036 A1 | 9/2009 |
| WO | WO 2010/023737 A1 | 4/2010 |
| WO | WO 2011/049778 A1 | 4/2011 |
| WO | WO 2012/174093 A2 | 12/2012 |

OTHER PUBLICATIONS

International Search Report for PCT/US2012/042246 dated Feb. 18, 2013.
Written Opinion for PCT/US2012/042246 dated Feb. 18, 2013.
Communication pursuant to Rules 161(1) and 162 EPC issued Feb. 27, 2014 for European Patent Application No. 12730102.6.
Australian Patent Examination Report No. 1 dated Aug. 28, 2014. Australian Patent Application No. 2012271769.
The Notification of the First Office Action from the Chinese Patent Office dated May 4, 2015. Chinese Patent Application No. 2012800358805.
The Notification of the Second Office Action from the Chinese Patent Office dated Nov. 3, 2015. Chinese Patent Application No. 2012800358805.
The Notification of the Third Office Action from the Chinese Patent Office dated Feb. 15, 2016. Chinese Patent Application No. 2012800358805.
Japanese Office Action dated Mar. 15, 2016 Japanese Patent Application No. JP2014-515958.
Russian Office Action dated Jun. 9, 2016 RU2013154965.
Fourth Office Action from the Chinese Patent Office dated Jul. 19, 2016. Chinese Patent Application No. 2012800358805.
Japanese Office Action for Japanese Patent Application No. JP2014-515958 dated Feb. 28, 2017.
The Notification of the Simple Report of the Fifth Office Action dated Mar. 7, 2017 for Chinese Patent Application No. 2012800358805.
Simple Report of Decision of rejection dated Sep. 5, 2017 for Chinese Patent Application No. 2012800358805.
Canadian Office Action dated May 31, 2018 for Canadian Patent Application No. 2,838,730.

* cited by examiner

REFRIGERATION SYSTEM AND METHODS FOR REFRIGERATION

The present application is a continuation of U.S. application Ser. No. 13/495,468 that was filed with the United States Patent and Trademark Office on Jun. 13, 2012. U.S. application Ser. No. 13/495,468 includes the disclosure of U.S. provisional application Ser. No. 61/496,160 that was filed with the United States Patent and Trademark Office on Jun. 13, 2011. A priority right is claimed to U.S. application Ser. No. 13/495,468 and U.S. provisional application Ser. No. 61/496,160 to the extent appropriate. The complete disclosures of Ser. No. 13/495,468 and Ser. No. 61/496,160 are incorporated herein by reference.

FIELD OF THE INVENTION

The disclosure generally relates to refrigeration systems and methods for refrigeration. The refrigeration systems can be industrial refrigeration systems having a centralized compressor arrangement and a plurality of decentralized condenser evaporator systems (CES). The transfer of refrigerant from the centralized compressor arrangement to and from the plurality of decentralized condenser systems can be provided as mostly in a gaseous state thereby reducing the amount of refrigerant needed for operating the refrigeration systems compared with refrigeration systems that transfer liquid refrigerant to and from evaporators. The refrigeration system can be referred to as a decentralized condenser refrigeration system (DCRS). The refrigeration system and method for refrigeration are advantageous for any type of refrigerant, but are particularly suited for the use of ammonia as a refrigerant.

BACKGROUND

Refrigeration utilizes the basic thermodynamic property of evaporation to remove heat from a process. When a refrigerant is evaporated in a heat exchanger, the medium that is in contact with the heat exchanger (i.e., air, water, glycol, food) transfers heat from itself through the heat exchanger wall and is absorbed by the refrigerant, resulting in the refrigerant changing from a liquid state to a gaseous state. Once the refrigerant is in a gaseous state, the heat must be rejected by compressing the gas to a high pressure state and then passing the gas through a condenser (a heat exchanger) where heat is removed from the gas by a cooling medium resulting in condensation of the gas to a liquid. The medium in the condenser that absorbs the heat in a cooling medium and is often water, air, or both water and air. The refrigerant in this liquid state is then ready to be used again as a refrigerant for absorbing heat.

In general, industrial refrigeration systems utilize large amounts of horsepower oftentimes requiring multiple industrial compressors. Due to this fact, industrial refrigeration systems typically include large centralized engine rooms and large centralized condensing systems. Once the compressors compress the gas, the gas that is to be condensed (not used for defrosting) is pumped to a condenser in the large centralized condensing system. The multiple condensers in a large centralized condensing system are often referred to as the "condenser farm." Once the refrigerant is condensed, the resulting liquid refrigerant is collected in a vessel called a receiver, which is basically a tank of liquid refrigerant.

There are generally three systems for conveying the liquid from the receiver to the evaporators so it can be used for cooling. They are the liquid overfeed system, the direct expansion system, and the pumper drum system. The most common type of system is the liquid overfeed system. The liquid overfeed system generally uses liquid pumps to pump liquid refrigerant from large vessels called "pump accumulators" and sometimes from similar vessels called "intercoolers" to each evaporator. A single pump or multiple pumps may deliver liquid refrigerant to a number of evaporators in a given refrigeration system. Because liquid refrigerant has a tendency to evaporate, it is often necessary to keep large amounts of liquid in the vessels (net positive suction head (NPSH)) so the pump does not lose its prime and cavitate. A pump cavitates when the liquid that the pump is attempting to pump absorbs heat inside and around the pump and gasifies. When this happens, the pump cannot pump liquid to the various evaporators which starve the evaporators of liquid, thus causing the temperature of the process to rise. It is important to note that liquid overfeed systems are designed to overfeed the evaporators. That is, the systems send excess liquid to each evaporator in order to ensure that the evaporator has liquid refrigerant throughout the entire circuit of the evaporator. By doing this, it is normal for large amounts of liquid refrigerant to return from the evaporator to the accumulator where the liquid refrigerant in turn is pumped out again. In general, the systems are typically set up for an overfeed ratio of about 4:1, which means that for every 4 gallons of liquid pumped out to an evaporator, 1 gallon evaporates and absorbs the heat necessary for refrigeration, and 3 gallons return un-evaporated. The systems require a very large amount of liquid refrigerant in order to provide the necessary overfeed. As a result, the systems require maintaining a large amount of liquid refrigerant to operate properly.

Figure 1:
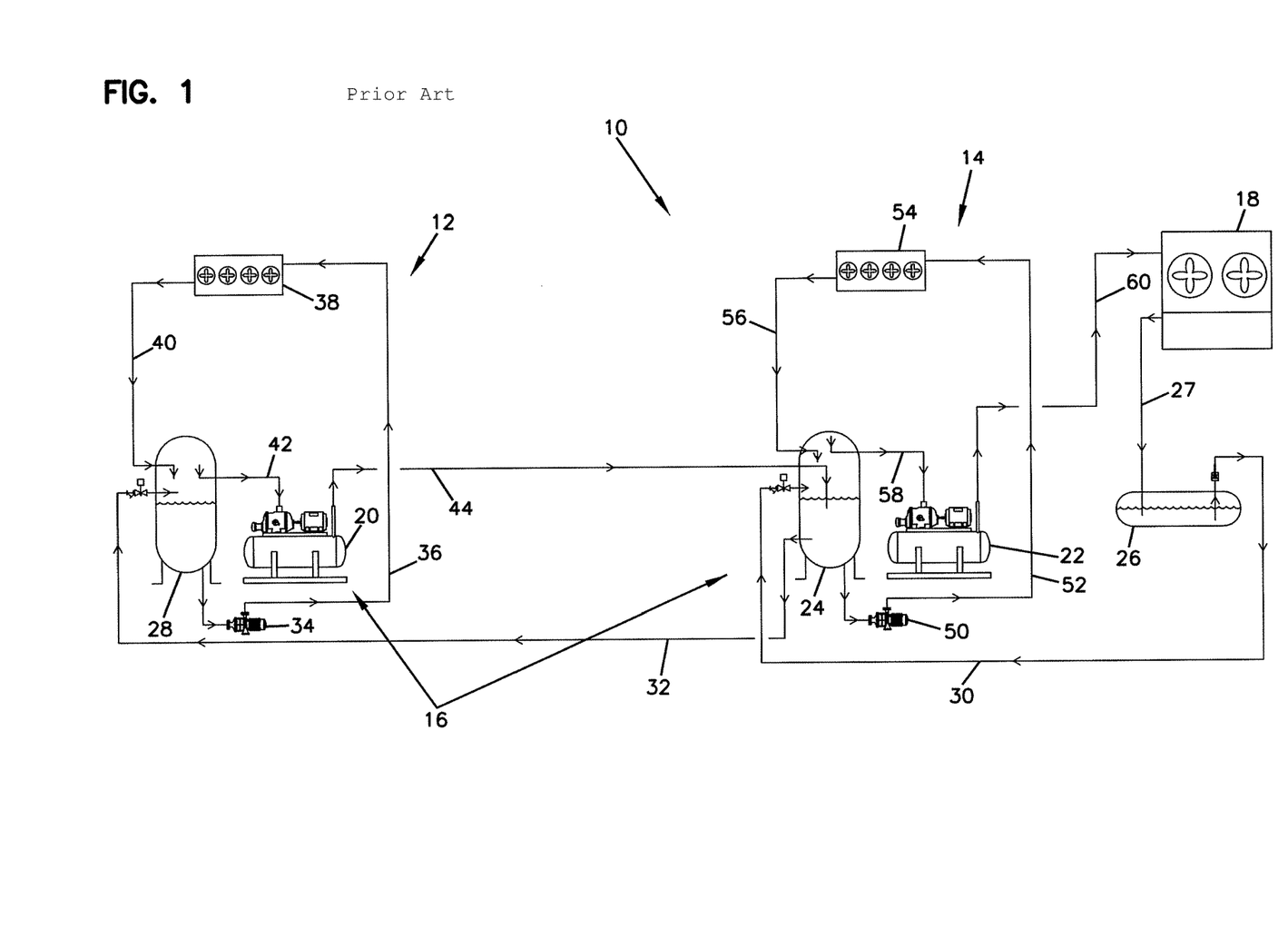
FIG. 1 is a schematic representation of a representative prior art industrial, multi-stage refrigeration system.

Referring to FIG. 1, a representative industrial, two-stage refrigeration system is depicted at reference number 10 and provides for liquid overfeed where the refrigerant is ammonia. The plumbing of various liquid overfeed refrigeration systems may vary, but the general principles are consistent. The general principles include the use of a centralized condenser or condenser farm 18, a high pressure receiver 26 for collecting condensed refrigerant, and the transfer of liquid refrigerant from the high pressure receiver 26 to various stages 12 and 14. The two-stage refrigeration system 10 includes a low stage system 12 and a high stage system 14. A compressor system 16 drives both the low stage system 12 and the high stage system 14, with the high stage system 14 sending compressed ammonia gas to the condenser 18. The compressor system 16 includes a first stage compressor 20, second stage compressor 22, and an intercooler 24. The intercooler 24 can also be referred to as a high stage accumulator. Condensed ammonia from the condenser 18 is fed to the high pressure receiver 26 via the condenser drain line 27 where the high pressure liquid ammonia is held at a pressure typically between about 100 psi and about 200 psi. With reference to the low stage system 12, the liquid ammonia is piped to the low stage accumulator 28 via the liquid lines 30 and 32. The liquid ammonia in the low stage accumulator 28 is pumped by the low stage pump 34, through the low stage liquid line 36 to the low stage evaporator 38. At the low stage evaporator 38, the liquid ammonia comes in contact with the heat of the process, thus evaporating approximately 25% to 33% (the percent evaporated can vary widely), leaving the remaining ammonia as a liquid. The gas/liquid mixture returns to the low stage accumulator 28 via the low stage suction line 40. The evaporated gas is drawn into the low stage compressor 20 via the low stage compressor suction line 42. As the gas is removed from the low stage system 12 via the low stage compressor 20 it is discharged to the intercooler 24 via line 44. It is necessary to replenish the ammonia that has been evaporated, so liquid ammonia is transferred from the receiver 26 to the intercooler 24 via liquid line 30, and then to the low stage accumulator 28 via liquid line 32.

The high stage system 14 functions in a manner similar to the low stage system 12. The liquid ammonia in the high stage accumulator or intercooler 24 is pumped by the high stage pump 50, through the high stage liquid line 52 to the high stage evaporator 54. At the evaporator 54, the liquid ammonia comes in contact with the heat of the process, thus evaporating approximately 25% to 33% (the percent evaporated can vary widely), leaving the remaining ammonia as a liquid. The gas/liquid mixture returns to the high stage accumulator or intercooler 24 via the high stage suction line 56. The evaporated gas is then drawn into the high stage compressor 22 via the high stage compressor suction line 58. As the gas is removed from the high stage system 14, it is necessary to replenish the ammonia that has been evaporated, so liquid ammonia is transferred from the high pressure receiver 26 to the intercooler 24 via the liquid line 30.

The system 10 can be piped differently but the basic concept is that there is a central condenser 18 which is fed by the compressor system 16, and condensed high pressure liquid ammonia is stored in a high pressure receiver 26 until it is needed, and then the liquid ammonia flows to the high stage accumulators or intercooler 24, and is pumped to the high stage evaporator 54. In addition, liquid ammonia at the intercooler pressure flows to the low stage accumulator 28, via liquid line 32, where it is held until pumped to the low stage evaporator 38. The gas from the low stage compressor 20 is typically piped via the low stage compressor discharge line 44 to the intercooler 24, where the gas is cooled. The high stage compressor 22 draws gas from the intercooler 24, compresses the gas to a condensing pressure and discharges the gas via the high stage discharge line 60 to the condenser 18 where the gas condenses back to a liquid. The liquid drains via the condenser drain line 27 to the high pressure receiver 26, where the cycle starts again.

The direct expansion system uses high pressure or reduced pressure liquid from a centralized tank. The liquid is motivated by a pressure difference between the centralized tank and the evaporator as the centralized tank is at a higher pressure then the evaporator. A special valve called an expansion valve is used to meter the flow of refrigerant into the evaporator. If it feeds too much, then un-evaporated liquid refrigerant is allowed to pass through to the compressor system. If it feeds to little, then the evaporator is not used to its maximum capacity, possibly resulting in insufficient cooling/freezing.

The pumper drum system works in a nearly identical fashion to the liquid overfeed system, with the main difference being that small pressurized tanks that act as pumps. In general, liquid refrigerant is allowed to fill the pumper drum, where a higher pressure refrigerant gas is then injected on top of the pumper drum thus using pressure differential to push the liquid into the pipes going to the evaporators. The overfeed ratios are generally the same, as is the large amount of refrigerant necessary to utilize this type of system.

SUMMARY

A refrigeration system is provided according to the present invention. The refrigeration system includes a compressor arrangement, a plurality of condenser evaporator systems, a first gaseous refrigerant feed line, and a second gaseous refrigerant feed line. The compressor arrangement is provided for compressing gaseous refrigerant from a first pressure to a second pressure wherein the second pressure is a condensing pressure. A condensing pressure is a pressure at which a refrigerant condenses when heat is removed, typically, in a condenser. The plurality of condenser evaporator systems (CES) each include a condenser for receiving gaseous refrigerant at a condensing pressure and condensing the refrigerant to a liquid refrigerant, a controlled pressure receiver (CPR) for holding the liquid refrigerant, and an evaporator for evaporating the liquid refrigerant to form gaseous refrigerant. The first gaseous refrigerant feed line is provided for feeding the gaseous refrigerant at the condensing pressure from the compressor arrangement to the plurality of condenser evaporator systems. The second gaseous refrigerant feed line is for feeding gaseous refrigerant from the plurality of condenser evaporator systems to the compressor arrangement.

An alternative refrigeration system is provided according to the present invention. The refrigeration system includes a centralized compressor arrangement and a plurality of condenser evaporator systems. Each condenser evaporator system includes a condenser for receiving gaseous refrigerant and condensing the gaseous refrigerant to a liquid refrigerant, a controlled pressure receiver for holding the liquid refrigerant from the condenser, and an evaporator for evaporating the liquid refrigerant to form gaseous refrigerant. The refrigeration system is constructed to convey gaseous refrigerant from the centralized compressor arrangement to the plurality of set condenser evaporator systems.

A process for feeding multiple condenser evaporator systems is provided according to the present invention. The process includes steps of: compressing gaseous refrigerant to a condensation pressure to form a hot gaseous refrigerant; feeding the hot gaseous refrigerant to a plurality of condenser evaporator systems; and feed the gaseous refrigerant from the plurality of condenser evaporator systems to a compressor arrangement constructed to compress the gaseous refrigerant to a condensing pressure. The process can include refrigeration as a result of evaporating liquid refrigerant in an evaporator, and can include hot gas defrost as a result of condensing gaseous refrigerant in an evaporator.

DETAILED DESCRIPTION

A refrigeration system is described that can be used in an industrial environment. In general, the refrigeration system has a centralized compressor arrangement and one or more decentralized condenser evaporator systems. As a result, the transfer of refrigerant from the centralized compressor arrangement to and from the one or more decentralized condenser systems can be provided as mostly (or entirely) gaseous refrigerant thereby reducing the amount of refrigerant needed to operate the refrigeration system compared with refrigeration systems that transfer liquid refrigerant from a centralized high pressure receiver tank to one or more evaporators.

Traditional ammonia refrigeration systems have used a centralized condensing system that involves large storage tanks or vessels that hold large amounts of ammonia in a reservoir. Depending on the type of vessel and refrigeration system, liquid pumps are typically used to pump large quantities of liquid ammonia through the system in order to deliver the liquid to the evaporators. As a result, the prior systems typically require the presence of a large amount of liquid ammonia within the system.

The refrigeration system according to the invention can be provided as a single stage system or as a multiple stage system. In general, a single stage system is one where a single compressor pumps the refrigerant from an evaporative pressure to a condensing pressure. For example, an evaporative pressure of about 30 psi to a condensing pressure of about 150 psi. A two stage system uses two or more compressors in series that pump from a low pressure (evaporative pressure) to an intermediate pressure, and then compresses the gas to a condensing pressure. An example of this would be a first compressor that compresses the gas from an evaporative pressure of about 0 psi to an intermediate pressure of about 30 psi, and a second compressor that compresses the gas from the intermediate pressure to a condensing pressure of about 150 psi. The purpose of a two stage system is primarily horsepower savings in addition to compressor compression ratio limitations on some models. Some plants may have two or more low stages, where one stage might be dedicated to run freezers at, for example −10 F, and another stage might be dedicated to running blast freezers at, for example −40 F. The refrigeration system can accommodate single, double, or any number or arrangements of stages. Some plants may have two or more high stages, or any combination of low and high stages.

Instead of using a large centralized condenser system and reservoirs for liquid refrigerant, the refrigeration system utilizes the condenser evaporator system (CES) described in U.S. provisional patent application Ser. No. 61/496,156 filed with the United States Patent and Trademark Office on Jun. 13, 2011, the entire disclosure of which is incorporated herein by reference. The CES can be considered a subsystem to the overall refrigeration system that includes a heat exchanger that acts as a condenser during refrigeration (and can act as an optional evaporator during hot gas defrost), a controlled pressure receiver (CPR) that acts as a refrigerant reservoir, an evaporator that absorbs the heat from the process (and can act as an optional condenser during hot gas defrost), and the appropriate arrangement of valves. Because the CES is a condenser, liquid refrigerant reservoir, and evaporator in one assembly, the refrigeration system that utilizes one or more CES can be decentralized. As a consequence, the movement of liquid refrigerant through the refrigeration system can be significantly decreased. By significantly reducing the amount of liquid refrigerant that is transported through the refrigeration system, the overall amount of refrigerant in the refrigeration system can be significantly reduced. By way of example, for a prior art refrigeration system such as the one described in FIG. 1, the amount of refrigerant can be decreased by at least about 85% or more as a result of utilizing a refrigeration system according to the invention that provides for a centralized compressor arrangement and decentralized CES(s) while maintaining approximately the same refrigeration capacity.

Figure 2:
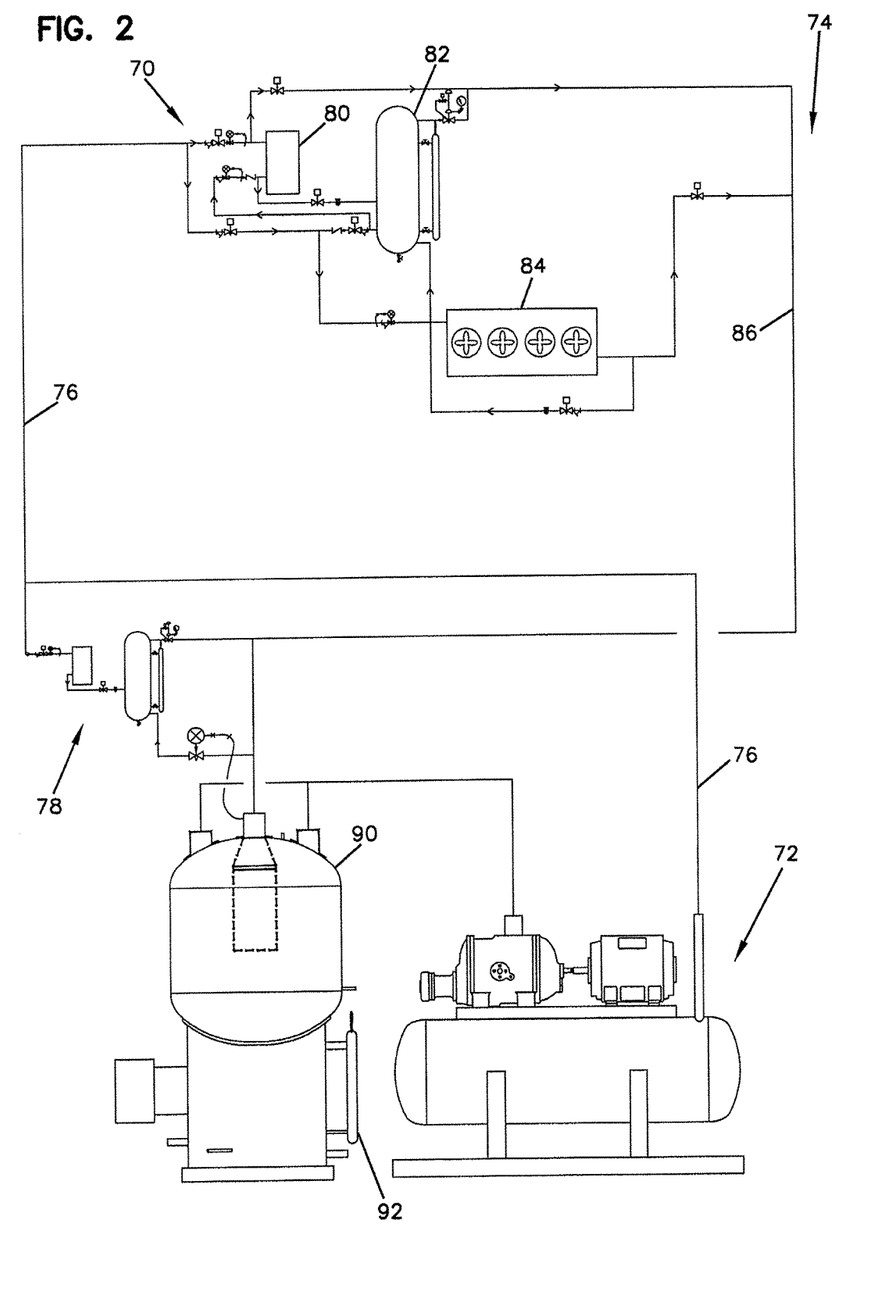
FIG. 2 is a schematic representation of a refrigeration system according to the principles of the present invention.

Now referring to FIG. 2, a refrigeration system according to the invention is shown at reference number 70. The refrigeration system 70 includes a compressor arrangement 72 and a CES 74. The compressor arrangement can be provided as a single stage or multiple stage compressor. In general, a gaseous refrigeration leaves the compressor arrangement 72 via the hot gas line 76. The gaseous refrigerant in the hot gas line 76 can be provided at a condensing pressure. A condensing pressure for a refrigerant is the pressure at which the refrigerant will have a tendency to condense to a liquid once heat is removed therefrom. As a result of passing through the hot gas line 76, some of the gaseous refrigerant may condense to a liquid. The condensed refrigerant can be removed from the hot gas line 76 by a squelch arrangement 78. Various squelch arrangements can be utilized. In general, a squelch arrangement can be provided to reduce the temperature or reduce the superheat of the evaporated refrigerant in the gaseous refrigerant return line 86. For the squelch arrangement 78, liquid refrigerant can be introduced into the gaseous refrigerant return line 86 to reduce the superheat in the gaseous refrigerant return line 86.

The compressed gaseous refrigerant flows in the hot gas line 76 to the condenser evaporator system 74 where it is either used for refrigeration or defrost. The condenser evaporator system 74 can operate in a refrigeration cycle or in a hot gas defrost cycle. When the condenser evaporator system 74 operates in a refrigeration cycle, the compressed gaseous refrigerant enters the condenser 80 where it is condensed to a liquid refrigerant. The liquid refrigerant then flows to the controlled pressure receiver 82, and the liquid refrigerant then flows from the controlled pressure receiver 82 to the evaporator 84 to provide refrigeration. As a result of passing through the evaporator 84, a portion of the liquid refrigerant is evaporated, and the evaporated refrigerant is removed from the condenser evaporator system 74 via the suction line 86. When the condenser evaporator system 74 functions in hot gas defrost, the roles of the heat exchanger 80 and evaporator 84 are essentially reversed. That is, the compressed refrigerant from the hot gas line 76 flows to the evaporator 84 where it is condensed to a liquid, and the liquid then flows to the controlled pressure receiver 82. The liquid refrigerant from the controlled pressure receiver 82 flows to the condenser 80 where it is evaporated, and the evaporated refrigerant returns to the compressor arrangement via the suction line 86.

The controlled pressure receiver 82 can be referred to more simply as the CPR or as the receiver. In general, a controlled pressure receiver is a receiver that, during operation, maintains a pressure within the receiver that is less than the condensing pressure. The lower pressure in the CPR can help drive flow, for example, from the condenser 80 to the CPR 82, and also from the CPR 82 to the evaporator 84. Furthermore, the evaporator 84 can operate more efficiently at a result of a pressure decrease by the presence of the CPR 82.

The evaporated refrigerant in the suction line 86 enters the compressor system 72 through the accumulator 90 and then to the compressor arrangement 72. The accumulator 90 functions to protect the compressor arrangement 72 by separating the liquid refrigerant from the gaseous refrigerant. In certain designs, the accumulator can function as an intercooler. When an accumulator is provided between compressor stages, the accumulator between the compressor stages can be referred to as an intercooler. The accumulator can be any accumulator that functions to separate liquid refrigerant from gaseous refrigerant. Exemplary accumulators include those described in U.S. Pat. Nos. 6,018,958, 6,349,564, and 6,467,302. The accumulator is a tank that acts as a separation space for incoming gas. Accumulators can be sized so that the incoming velocity of the gas reduces sufficiently. Liquid refrigerant entrained in the gas stream to drop out, so that the liquid is not drawn into the compressor arrangement 72. A refrigeration system can include more than one accumulator. In a two stage system, the second accumulator is often referred to as a "intercooler" because it allows for cooling of discharged gas from a first compressor. The accumulator 90 has a sensor 92 that monitors liquid that has accumulated in the tank. In order to keep maximum flexibility, the accumulator 90 can feature a method of condensing gas and evaporating liquid. With this feature, tanks can be used to store excess liquid (reservoir) for a variety of situations, including any upsets due to defrost, malfunctions, refrigerant loss, general liquid storage, etc.

Figure 3:
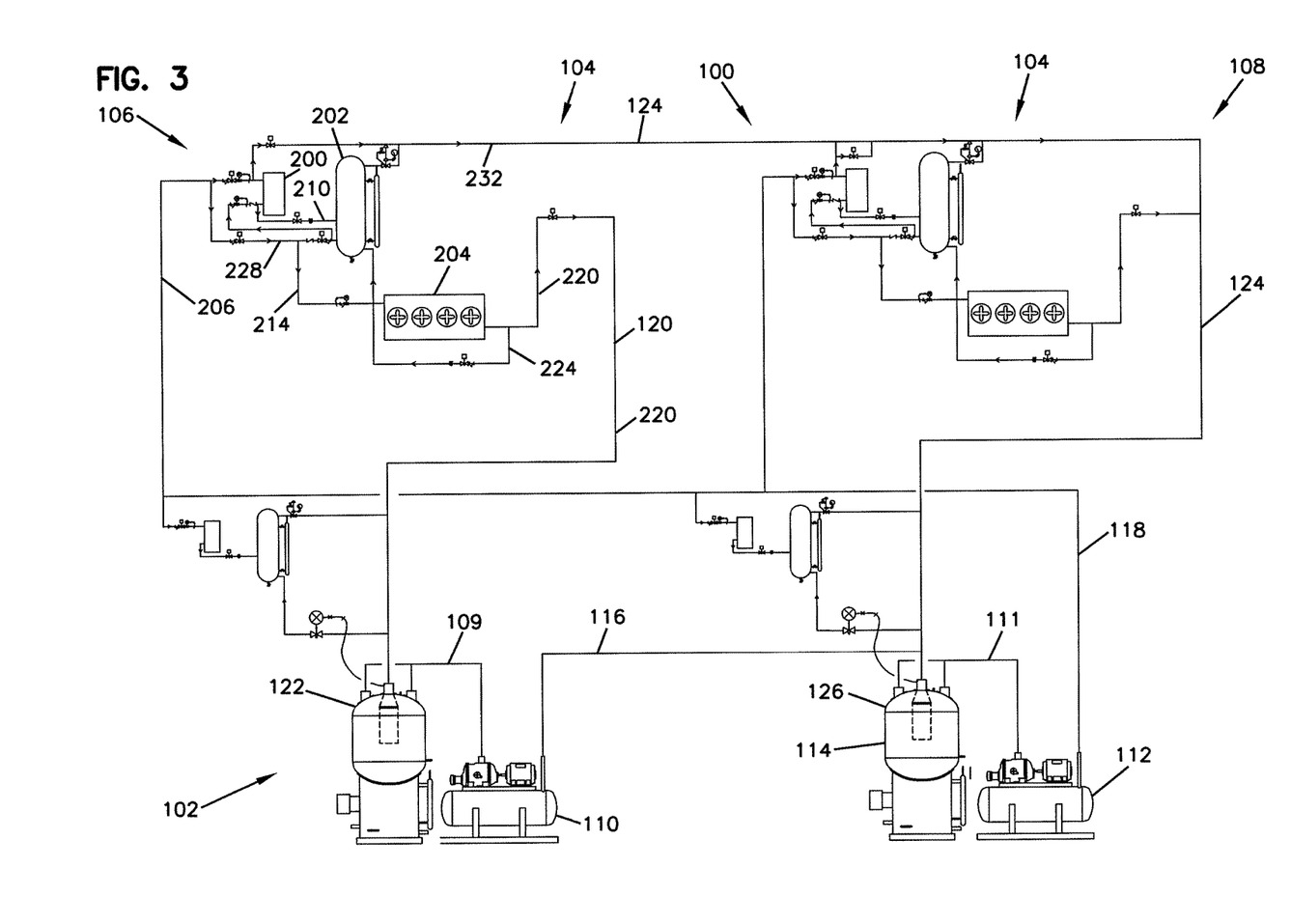
FIG. 3 is a schematic representation of a multi-stage refrigeration system according to the principles of the present invention.

Now referring to FIG. 3, a refrigeration system that utilizes multiple condenser evaporator systems (CES) according to the invention is shown at reference number 100. The refrigeration system 100 includes a centralized compressor arrangement 102 and a plurality of condenser evaporator systems 104. For the multi-stage refrigeration system 100, two evaporator condenser evaporator systems 106 and 108 are shown. It should be appreciated that additional condenser evaporator systems can be provided, as desired. The condenser evaporator system 106 can be referred to as a low stage condenser evaporator system, and the condenser evaporator system 108 can be referred to as a high stage condenser evaporator system. In general, the low stage CES 106 and high stage CES 108 are presented to illustrate how the multi-stage refrigeration system 100 can provide for different heat removal or cooling requirements. For example, the low stage CES 106 can be provided so that it operates to create a lower temperature environment than the environment created by the high stage CES 108. For example, the low stage CES 106 can be used to provide blast freezing at about −40° F. The high stage CES 108, for example, can provide an area that is cooled to a temperature significantly higher than −40° F. such as, for example, about ±10° F. to about 30° F. It should be understood that these values are provided for illustration. One would understand that the cooling requirements for any industrial facility can be selected and provided by the multi-stage refrigeration system according to the invention.

For the multi-stage refrigeration system 100, the centralized compressor arrangement 102 includes a first stage compressor arrangement 110 and a second stage compressor arrangement 112. The first stage compressor arrangement 110 can be referred to as a first or low stage compressor, and the second stage compressor arrangement 112 can be referred to as a second or high stage compressor. Provided between the first stage compressor arrangement 110 and the second stage compressor arrangement 112 is an intercooler 114. In general, gaseous refrigerant is fed via the first stage compressor inlet line 109 to the first stage compressor arrangement 110 where it is compressed to an intermediate pressure, and the gaseous refrigerant at the intermediate pressure is conveyed via the intermediate pressure refrigerant gas line 116 to the intercooler 114. The intercooler 114 allows the gaseous refrigerant at the intermediate pressure to cool, but also allows any liquid refrigerant to be separated from the gaseous refrigerant. The intermediate pressure refrigerant is then fed to the second stage compressor arrangement 112 via the second compressor inlet line 111 where the refrigerant is compressed to a condensing pressure. By way of example, and in the case of ammonia as the refrigerant, gaseous refrigerant may enter the first stage compressor arrangement 110 at a pressure of about 0 psi, and can be compressed to a pressure of about 30 psi. The gaseous refrigerant at about 30 psi can then be compressed via the second stage compressor arrangement 112 to a pressure of about 150 psi.

In general operation, the gaseous refrigerant compressed by the centralized compressor arrangement 102 flows via the hot gas line 118 to the plurality of condenser evaporator systems 104. The gaseous refrigerant from the compressor arrangement 102 that flows into the hot gas line 118 can be referred to as a source of compressed gaseous refrigerant that is used to feed one or more compressor evaporator systems 104. As shown in FIG. 3, the source of compressed gaseous refrigerant feeds both the CES 106 and the CES 108. The source of compressed gaseous refrigerant can be used to feed more than two compressor evaporator systems. For an industrial ammonia refrigeration system, the single source of compressed gaseous refrigerant can be used to feed any number of compressor evaporator systems, such as, for example at least one, at least two, at least three, at least four, etc., compressor evaporator systems.

The gaseous refrigerant from the low stage CES 106 is recovered via the low stage suction (LSS) line 120 and is fed to the accumulator 122. The gaseous refrigerant from the high stage CES 108 is recovered via the high stage suction line (HSS) 124 and is fed to the accumulator 126. As discussed previously, the intercooler 114 can be characterized as the accumulator 126. The accumulators 122 and 126 can be constructed for receiving gaseous refrigerant and allowing separation between gaseous refrigerant and liquid refrigerant so that essentially only gaseous refrigerant is sent to the first stage compressor arrangement 110 and the second c stage compressor arrangement 112.

Gaseous refrigerant returns to the accumulators 122 and 126 via the low stage suction line 120 and the high stage suction line 124, respectively. It is desirable to provide the returning gaseous refrigerant at a temperature that is not too hot or too cool. If the returning refrigerant is too hot the additional heat (i.e., superheat) may adversely effect the heat of compression in the compressor arrangements 110 and 112. If the returning refrigerant is too cool, there may be a tendency for too much liquid refrigerant to build up in the accumulators 122 and 126. Various techniques can be utilized for controlling the temperature of the returning gaseous refrigerant. One technique shown in FIG. 3 is a squelch system 160. The squelch system 160 operates by introducing liquid refrigerant into the returning gaseous refrigerant via the liquid refrigerant line 162. The liquid refrigerant introduced into the returning gaseous refrigerant in the low stage suction line 120 or the high stage suction line 124 can reduce the temperature of the returning gaseous refrigerant. A valve 164 can be provided for controlling flow of liquid refrigerant through the liquid refrigerant line 162, and can respond as a result of a signal 166 from the accumulators 122 and 126. Gaseous refrigerant can flow from the hot gas line 118 to the gaseous refrigerant squelch line 168 where flow is controlled by a valve 169. A heat exchanger 170 condenses the gaseous refrigerant, and the liquid refrigerant flows via the liquid refrigerant receiver line 172 into a controlled pressure receiver 174. A receiver pressure line 176 can provide communication between the low stage suction line 120 or the high stage suction line 124 and the controlled pressure receiver 174 in order to enhance flow of liquid refrigerant through the liquid refrigerant line 162.

The accumulators 122 and 126 can be constructed so that they allow for the accumulation of liquid refrigerant therein. In general, the refrigerant returning from the low stage suction line 120 and the high stage suction line 124 is gaseous. Some gaseous refrigerant may condense and collect in the accumulators 122 and 126. The accumulators can be constructed so that they can provide evaporation of liquid refrigerant. In addition, the accumulators can be constructed so that a liquid refrigerant can be recovered therefrom. Under certain circumstances, the accumulators can be used to store liquid refrigerant.

Figure 4:
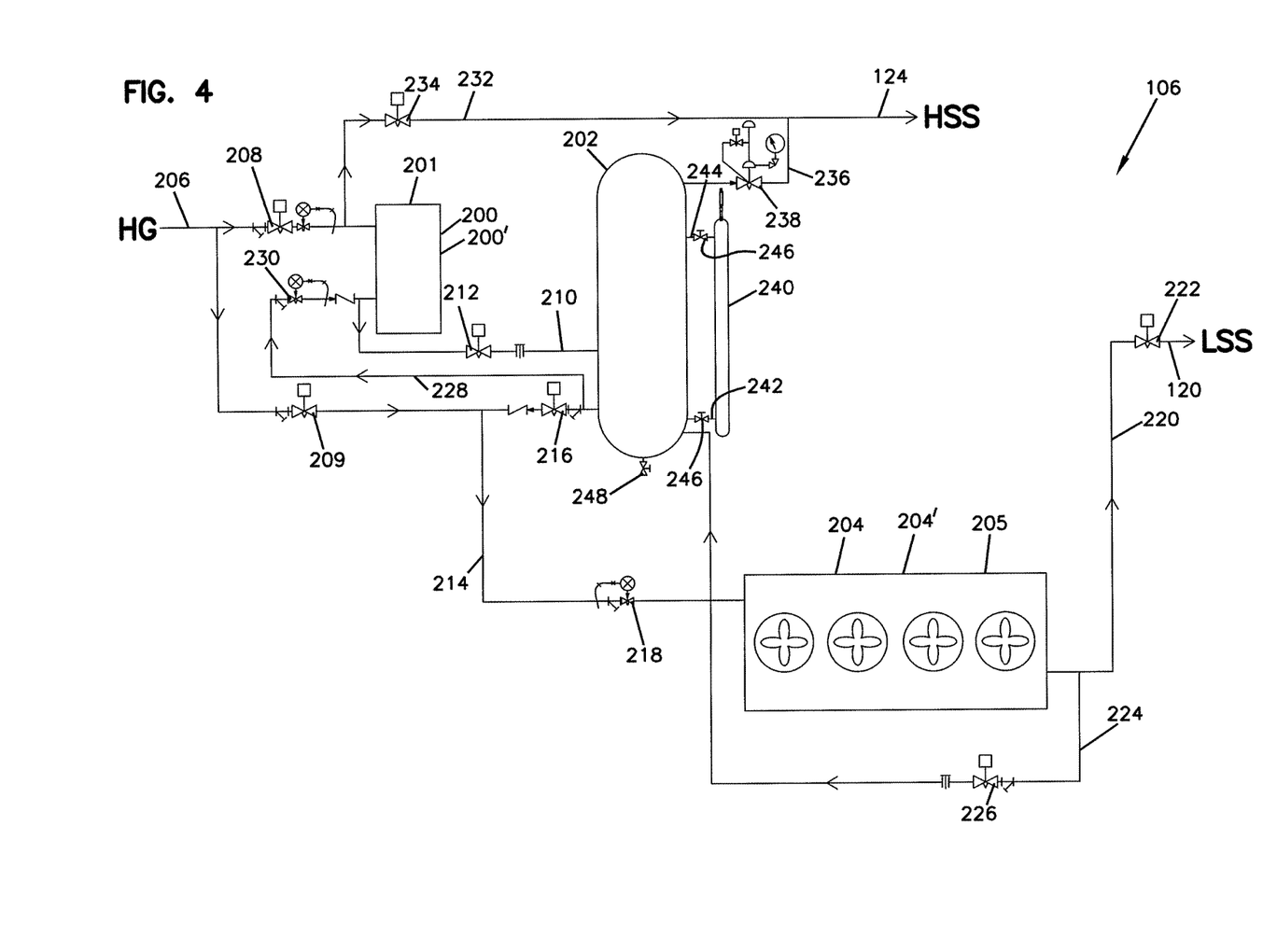
FIG. 4 is a schematic representation of a condenser evaporator system according to FIG. 3.

Now referring to FIG. 4, the condenser evaporator system 106 is provided in more detail. The condenser evaporator system 106 includes a condenser 200, a controlled pressure receiver 202, and an evaporator 204. In general, the condenser 200, the controlled pressure receiver 202, and the evaporator 204 can be sized so that they work together to provide the evaporator 204 with the desired refrigeration capacity. In general, the evaporator 204 is typically sized for the amount of heat it needs to absorb from a process. That is, the evaporator 204 is typically sized based upon the level of refrigeration it is supposed to provide in a given facility. The condenser 200 can be rated to condense the gaseous refrigerant at approximately the same rate that the evaporator 204 evaporates the refrigerant during refrigeration in order to provide a balanced flow within the CES. By providing a balanced flow, it is meant that the heat removed from the refrigerant by the condenser 200 is roughly equivalent to the heat absorbed by the refrigerant in the evaporator 204. It should be appreciated that a balanced flow can be considered a flow over a period of time that allows the evaporator to achieve a desired level of performance. In other words, as long as the evaporator 204 is performing as desired, the CES can be considered balanced. This is in contrast to a centralized condenser farm that services several evaporators. In the case of a centralized condenser farm servicing several evaporators, the condenser farm is not considered balanced with respected to any one particular evaporator. Instead, the condenser farm is considered balanced for the totality of the evaporators. In contrast, in the CES, the condenser 200 is dedicated to the evaporator 204. The condenser 200 can be referred to as an evaporator dedicated condenser. Within a CES, the condenser 200 can be provided as a single unit or as multiple units arranged in series or parallel. Similarly, the evaporator 204 can be provided as a single unit or multiple units arranged in series or parallel.

There may be occasions when the CES needs to be able to evaporate liquid refrigerant in the condenser 200. One reason is the use of hot gas defrosting in the CES. As a result, the condenser 200 can be sized so that it evaporates refrigerant at approximately the same rate that the evaporator 204 is condensing the refrigerant during the hot gas defrost in order to provide a balanced flow. As a result, the condenser 200 can be "larger" than required for condensing gaseous refrigerant during a refrigeration cycle.

For a conventional industrial refrigeration system that utilizes a centralized "condenser farm" and a plurality of evaporators that are fed liquid refrigerant from a central high pressure receiver, the condenser farm is not balanced with respect to anyone of the evaporators. Instead, the condenser farm is generally balanced with the total thermal capacity of all of the evaporators. In contrast, for a CES, the condenser and the evaporator can be balanced with respect to each other.

The condenser evaporator system 106 can be considered a subsystem of an overall refrigeration system. As a subsystem, the condenser evaporator system can generally operate independently from other condenser evaporator systems that might also be present in the refrigeration system. Alternatively, the condenser evaporator system 106 can be provided so that it operates in conjunction with one or more other condenser evaporator systems in the refrigeration system. For example, two or more CESs can be provided that work together to refrigerate a particular environment.

The condenser evaporator system 106 can be provided so that it functions in both a refrigeration cycle and in a defrost cycle. The condenser 200 can be a heat exchanger 201 that functions as a condenser 200 in a refrigeration cycle and as an evaporator 200' in a hot gas defrost cycle. Similarly, the evaporator 204 can be a heat exchanger 205 that functions as an evaporator 204 in a refrigeration cycle and as a condenser 204' in a hot gas defrost cycle. Accordingly, one skilled in the art will understand that the heat exchanger 201 can be referred to as a condenser 200 when functioning in a refrigeration cycle and as an evaporator 200' when functioning in a hot gas defrost cycle. Similarly, the heat exchanger 205 can be referred to as an evaporator 204 when functioning in a refrigeration cycle and as a condenser 204' when functioning in a hot gas defrost cycle. A hot gas defrost cycle refers to a method where the gas from the compressor is introduced into an evaporator in order to heat the evaporator to melt any accumulated frost or ice. As a result, the hot gas loses heat and is condensed. The CES can be referred to as a dual function system when it can function in both refrigeration and hot gas defrost. A dual function system is beneficial for the overall condensing system because the condensing medium can be cooled during the hot gas defrost cycle, thus resulting in energy savings which increases overall efficiency. The frequency of a hot gas defrost cycle can vary from one defrost per unit per day to defrosting every hour, and the savings by reclaiming this heat can be substantial. This type of heat reclamation is not possible in traditional systems that do not provide for a hot gas defrost cycle. Other methods for defrosting include, but are not limited to, using air, water, and electric heat. The condenser evaporator systems are adaptable to the various methods of defrosting.

The condenser evaporator system 106 can be fed gaseous refrigerant via the hot gas line 206. The condenser evaporator system 106 can be provided at a location remote from the centralized compressor arrangement of the refrigeration system. By feeding gaseous refrigerant to the condenser evaporator system 106, there can be a significant reduction in the amount of refrigerant required by the refrigeration system because refrigerant being fed to the condenser evaporator systems 106 is being fed in a gaseous form rather than in a liquid form. As a result, the refrigeration system can function at a capacity essentially equivalent to the capacity of a conventional liquid feed system but with significantly less refrigerant.

The operation of the condenser evaporator system 106 can be described when operating in a refrigeration cycle and when operating in a defrost cycle. The gaseous refrigerant flows through the hot gas line 206, and the flow of the gaseous refrigerant can be controlled by the hot gas refrigeration cycle flow control valve 208 and the hot gas defrost flow control valve 209. When operating in refrigeration cycle, the valve 208 is open and the valve 209 is closed. When operating in defrost cycle, the valve 208 is closed and the valve 209 is open. The valves 208 and 209 can be provided as on/off solenoid valves or as modulating valves that control the rate of flow of the gaseous refrigerant. The flow of refrigerant can be controlled or adjusted based on the liquid refrigerant level in the controlled pressure receiver 202.

The condenser 200 is a heat exchanger 201 that functions as a condenser when the condenser evaporator system 106 is functioning in a refrigeration cycle, and can function as an evaporator when the condenser evaporator system 106 is functioning in a defrost cycle such as a hot gas method of defrosting. When functioning as a condenser during a refrigeration cycle, the condenser condenses high pressure refrigerant gas by removing heat from the refrigerant gas. The refrigerant gas can be provided at a condensing pressure which means that once heat is removed from the gas, the gas will condense to a liquid. During the defrost cycle, the heat exchanger acts as an evaporator by evaporating condensed refrigerant. It should be appreciated that the heat exchanger is depicted in FIG. 4 as a single unit. However, it should be understood that it is representative of multiple units that can be arranged in parallel or series to provide the desired heat exchange capacity. For example, if additional capacity during defrost is required due to excess condensate, an additional heat exchanger unit can be employed. The heat exchanger 201 can be provided as a "plate and frame" heat exchanger. However, alternative heat exchangers can be utilized including shell and tube heat exchangers. The condensing medium for driving the heat exchanger can be water or a water solution such as a water and glycol solution, or any cooling medium including carbon dioxide or other refrigerant. The condensing medium can be cooled using conventional techniques such as, for example, a cooling tower or a ground thermal exchange. In addition, heat in the condensing medium can be used in other parts of an industrial or commercial facility.

Condensed refrigerant flows from the heat exchanger 201 to the controlled pressure receiver 202 via the condensed refrigerant line 210. The condensed refrigerant line 210 can include a condenser drain flow control valve 212. The condenser drain flow control valve 212 can control the flow of condensed refrigerant from the heat exchanger 200 to the controlled pressure receiver 202 during the refrigeration cycle. During the defrost cycle, the condenser drain flow control valve 212 can be provided to stop the flow of refrigerant from the heat exchanger 201 to the controlled pressure receiver 202. An example of the condenser drain flow control valve 212 is a solenoid and a float which only allows liquid to pass through and shuts off if gas is present.

The controlled pressure receiver 202 acts as a reservoir for liquid refrigerant during both the refrigeration cycle and the defrost cycle. In general, the level of liquid refrigerant in the controlled pressure receiver 202 tends to be lower during the refrigeration cycle and higher during the defrost cycle. The reason for this is that the liquid refrigerant inside the evaporator 204 is removed during the defrost cycle and is placed in the controlled pressure receiver 202. Accordingly, the controlled pressure receiver 202 is sized so that it is large enough to hold the entire volume of liquid that is normally held in the evaporator 204 during the refrigeration cycle plus the volume of liquid held in the controlled pressure receiver 202 during the refrigeration cycle. Of course, the size of the controlled pressure receiver 202 can be larger, if desired. As the level of refrigerant in the controlled pressure receiver 202 rises during a defrost cycle, the accumulated liquid can be evaporated in the heat exchanger 201. In addition, the controlled pressure receiver can be provided as multiple units, if desired.

During the refrigeration cycle, liquid refrigerant flows from the controlled pressure receiver 202 to the evaporator 204 via the evaporator feed line 214. Liquid refrigerant flows out of the controlled pressure receiver 202 and through the control pressure liquid feed valve 216. The control pressure liquid feed valve 216 regulates the flow of liquid refrigerant from the controlled pressure receiver 202 to the evaporator 204. A feed valve 218 can be provided in the evaporator feed line 214 for providing more precise flow control. It should be understood, however, that if a precise flow valve such as an electronic expansion valve is used as the control pressure liquid feed valve 216, then the feed valve 218 may be unnecessary.

The evaporator 204 can be provided as an evaporator that removes heat from air, water, or any number of other mediums. Exemplary types of systems that can be cooled by the evaporator 204 include evaporator coils, shell and tube heat exchangers, plate and frame heat exchangers, contact plate freezers, spiral freezers, and freeze tunnels. The heat exchangers can cool or freeze storage freezers, processing floors, air, potable and non-potable fluids, and other chemicals. In nearly any application where heat is to be removed, practically any type of evaporator can be used with the CES system.

Gaseous refrigerant can be recovered from the evaporator 204 via the LSS line 220. Within the LSS line 220 can be provided a suction control valve 222. Optionally, an accumulator can be provided in line 220 to provide additional protection from liquid carryover. The suction control valve 222 controls the flow of evaporated refrigerant from the evaporator 204 to the centralized compressor arrangement. The suction control valve 222 is normally closed during the defrost cycle. In addition, during the defrost cycle, the evaporator 204 functions as a condenser condensing gaseous refrigerant to a liquid refrigerant, and the condensed liquid refrigerant flows from the evaporator 204 to the controlled pressure receiver 202 via the liquid refrigerant recovery line 224. Latent and sensible heat can be provided to defrost the evaporator during the defrost cycle. Other type of defrosting such as water and electric heat can be used to remove frost. Within the liquid refrigerant recovery line 224 can be a defrost condensate valve 226. The defrost condensate valve 226 controls the flow of condensed refrigerant from the evaporator 204 to the controlled pressure receiver 202 during the defrost cycle. The defrost condensate valve 226 is normally closed during the refrigeration cycle.

During the hot gas defrost cycle, liquid refrigerant from the controlled pressure receiver 202 flows via the liquid refrigerant defrost line 228 to the evaporator 200'. Within the liquid refrigerant defrost line 228 can be a defrost condensate evaporation feed valve 230. The defrost condensate evaporation feed valve 230 controls the flow of liquid refrigerant from the controlled pressure receiver 202 to the evaporator 200' during the defrost cycle to evaporate the liquid refrigerant into a gaseous state. During the defrost cycle, the evaporator 200' operates to cool the heat exchange medium flowing through the evaporator 200'. This can help to cool the medium which can help save electricity by allowing the cooling to lower the medium temperature for other condensers elsewhere in the plant where the refrigeration system is operating. Furthermore, during the hot gas defrost cycle, gaseous refrigerant flows out of the evaporator 200' via the HSS line 232. Within the HSS line is a defrost condensate evaporation pressure control valve 234. The defrost condensate evaporation pressure control valve 234 regulates the pressure within the evaporator 200' during the defrost cycle. The defrost condensate evaporation pressure control valve 234 is normally closed during the refrigeration cycle. The defrost condensate evaporation pressure control valve 234 can be piped to the LSS line 220. In general, this arrangement is not as efficient. It is also optional to include a small accumulator in line 232 to provide additional protection from liquid carryover.

Extending between the controlled pressure receiver 202 and the HSS line 232 is a controlled pressure receiver suction line 236. Within the controlled pressure receiver suction line 236 is a controlled pressure receiver pressure control valve 238. The controlled pressure receiver pressure control valve 238 controls the pressure within the controlled pressure receiver 202. Accordingly, the pressure within the controlled pressure receiver 202 can be controlled via the controlled pressure receiver pressure control valve 238. It should be appreciated that the controlled pressure receiver suction line 236 can be arranged to that it extends from the controlled pressure receiver 202 to the LSS line 220 instead of or in addition to the HHS line 232. In general, it may be more efficient for the controlled pressure receiver line to extend to the HSS line 232, or to the economizer port on a screw compressor when used as a high stage compressor.

A controlled pressure receiver liquid level control assembly 240 is provided for monitoring the level of liquid refrigerant in the controlled pressure receiver 202. The information from the controlled pressure receiver liquid level control assembly 240 can be processed by a computer and various valves can be adjusted in order to maintain a desired level. The liquid refrigerant level within the controlled pressure receiver liquid level control assembly 240 can be observed, and the level changed as a result of communication via the liquid line 242 and the gaseous line 244. Both the liquid line 242 and the gaseous line 244 can include valves 246 for controlling flow.

At the bottom of the controlled pressure receiver 202 can be provided an optional oil drain valve 248. The oil drain valve 248 can be provided in order to remove any accumulated oil from the controlled pressure receiver 202. Oil often becomes entrained in refrigerant and tends to separate from liquid refrigerant and sinks to the bottom because it is heavier.

A compressor can be provided as a compressor dedicated for each CES. It is more preferable, however, for multiple CES's to feed a compressor or a centralized compressor arrangement. For an industrial system, a centralized compressor arrangement is typically more desirable.

The condenser evaporator system can provide for a reduction in the amount of refrigerant (such as, for example, ammonia) in an industrial refrigeration system. Industrial refrigeration systems include those that generally rely on centralized engine rooms where one or more compressors provide the compression for multiple evaporators, and a centralized condenser system. In such systems, liquid refrigerant is typically conveyed from a storage vessel to the multiple evaporators. As a result, a large amount of liquid is often stored and transported to the various evaporators. By utilizing multiple condenser evaporator systems, it is possible that a reduction in the amount of refrigerant by at least about 85% can be achieved. It is expected that greater reductions can be achieved but that, of course, depends on the specific industrial refrigeration system. In order to understand how a reduction in the amount of ammonia in an industrial refrigeration system can be achieved, consider that during the refrigeration cycle, the refrigerant changes from a liquid to a gas by absorbing heat from a medium (such as, air, water, food, etc.). Liquid refrigerant (such as, ammonia) is delivered to an evaporator for evaporation. In many industrial refrigeration systems, the liquid refrigerant is held in centralized tanks called receivers, accumulators, and intercoolers depending on their function in the system. This liquid ammonia is then pumped in a variety of ways to each evaporator in the facility for refrigeration. This means that much of the pipe in these industrial systems contain liquid ammonia. Just as a glass of water contains more water molecules then a glass that contains water vapor, liquid ammonia in a pipe contains typically 95% more ammonia in a given length of pipe versus a pipe with ammonia gas. The condenser evaporator system reduces the need for transporting large amounts of liquid refrigerant throughout the system by decentralizing the condensing system using one or more condenser evaporator system. Each condenser evaporator system can contain a condenser that is generally sized to the corresponding evaporator load. For example, for a 10 ton (120,000 BTU) evaporator, the condenser can be sized to at least the equivalent of 10 tons. In prior industrial refrigeration system, in order to get the evaporated gas back to a liquid so it can be evaporated again, the gas is compressed by a compressor and sent to one or more centralized condensers or condenser farms where the heat is removed from the ammonia, thus causing the refrigerant ammonia to condense to a liquid. This liquid is then pumped to the various evaporators throughout the refrigerant system.

In a system that uses the CES, the gas from the evaporators is compressed by the compressors and sent back to the CES as high pressure gas. This gas is then fed to the condenser 200. During a refrigeration cycle, the condenser 200 (such as a plate and frame heat exchanger) has a cooling medium flowing there through. The cooling medium can include water, glycol, carbon dioxide, or any acceptable cooling medium. The high pressure ammonia gas transfers the heat that it absorbed during compression to the cooling medium, thus causing the ammonia to condense to a liquid. This liquid is then fed to the controlled pressure receiver 202 which is held at a lower pressure then the condenser 200 so that the liquid can drain easily. The pressure in the controlled pressure receiver is regulated by the valve 238 in the controlled pressure receiver line 236. The liquid level inside the controlled pressure receiver 202 is monitored by a liquid level central assembly 240. If the liquid level gets too high or too low during refrigeration, valve 208 will open, close, or modulate accordingly to maintain the proper level.

The controlled pressure receiver 202 acts as a reservoir that holds the liquid to be fed into the evaporator 204. Since the condenser 200 and the controlled pressure receiver 202 are sized for each evaporator 204, the refrigerant is condensed as needed. Because the refrigerant is condensed in proximity to the evaporator 204 as needed, there is less of a need to transport liquid refrigerant over long distances thus allowing for the dramatic reduction in overall ammonia charge (for example, approximately at least 85% compared with a traditional refrigeration system having approximately the same refrigeration capacity). As the evaporator 204 requires more ammonia, valves 216 and 218 open to feed the right amount of ammonia into the evaporator 204 so that the ammonia is evaporated before the ammonia leaves the evaporator 204 so that no liquid ammonia goes back to the compressor arrangement. The valve 222 will shut the flow of ammonia off when the unit is off and/or undergoing defrosting.

The operation of the condenser evaporator system 106 can be explained in terms of both the refrigeration cycle and the defrost cycle. When the condenser evaporator system 106 operates in a refrigeration cycle, gaseous refrigerant at a condensing pressure can be feed via the hot gas line 206 from the compressor system to the condenser 200. In this case, the refrigeration cycle flow control valve 208 is open and the hot gas defrost flow control valve 209 is closed. Gaseous refrigerant enters the condenser 200 and is condensed to a liquid refrigerant. The condenser 200 can utilize any suitable cooling medium such as water or a glycol solution which is pumped through the condenser 200. One would understand that the heat recovered from the cooling medium can be recovered and used elsewhere.

Condensed refrigerant flows from the condenser 200 to the controlled pressure receiver 202 via the condensed refrigerant line 210 and the condenser drain flow control valve 212. Condensed refrigerant accumulates within the controlled pressure receiver 202, and the level of liquid refrigerant can be determined by the controlled pressure receiver liquid level control assembly 240. Liquid refrigerant flows out of the controlled pressure receiver 202 via the evaporator feed line 214 and the control pressure liquid feed valve 216 and 218 and into the evaporator 204. The liquid refrigerant within the evaporator 204 is evaporated and gaseous refrigerant is recovered from the evaporator 204 via the LSS line 220 and the suction control valve 222.

It is interesting to note that during the refrigeration cycle, there is no need to operate the evaporator based on liquid overfeed. That is, all of the liquid that enters the evaporator 204 can be used to provide refrigeration as a result of evaporating to gaseous refrigerant. As a result, heat transfers from a medium through the evaporator and into the liquid refrigerant causing the liquid refrigerant to become gaseous refrigerant. The medium can essential be any type of medium that is typically cooled. Exemplary media include air, water, food, carbon dioxide, and/or another refrigerant.

One of the consequences of refrigeration is the buildup of frost and ice on the evaporator. Therefore, every coil that receives refrigerant at low temperatures sufficient to develop frost and ice should go through a defrost cycle to maintain a clean and efficient coil. There are generally four methods of removing frost and ice on a coil. These methods include water, electric, air, and hot gas (such as high pressure ammonia). The CES will work with all methods of defrosting. The CES is particularly adapted for defrosting using the hot gas defrosting technique.

During hot gas defrost, the flow of hot gaseous refrigerant through the CES can be reversed so that the evaporator is defrosted. The hot gas can be fed to the evaporator and condensed to liquid refrigerant. The resulting liquid refrigerant can be evaporated in the condenser. This step of evaporating can be referred to as "local evaporating" because it occurs within the CES. As a result, one can avoid sending liquid refrigerant to a centralized vessel such as an accumulator for storage. The CES thereby can provide hot gas defrost of evaporators without the necessity of utilizing storing large quantities of liquid refrigerant.

During hot gas defrost, high pressure ammonia gas that normally goes to the condenser is instead directed into an evaporator. This warm gas condenses into a liquid, thus warming up the evaporator causing the internal temperature of the evaporator to become warm enough that the ice on the outside of the coils melts off. Prior refrigeration systems often take this condensed liquid and flow it back through pipes to large tanks where it is used again for refrigeration. A refrigeration system that utilizes the CES, in contrast, can use the condensed refrigerant generated during hot gas defrost and evaporated back into a gas in order to eliminate excess liquid ammonia in the system.

During a defrost cycle, gaseous refrigerant at a condensing pressure is feed via the hot gas line 206 to the condenser 204'. The gaseous refrigerant flows through the hot gas defrost flow control valve 209 (the refrigeration cycle control valve 208 is closed) and into the evaporator feed line 214 and through the feed valve 218. The gaseous refrigerant within the condenser 204' is condensed to liquid refrigerant (which consequently melts the ice and frost) and is recovered via the liquid refrigerant recovery line 224 and the defrost condensate valve 226. During defrost, the suction control valve 222 can be closed. The liquid refrigerant then flows via the liquid refrigerant recovery line 224 and into the controlled pressure receiver 202. Liquid refrigerant flows from the controlled pressure receiver 202 via the liquid refrigerant defrost line 228 and through the defrost condensate evaporation feed valve 230 and into the evaporator 200'. At this time, the control pressure liquid feed valve 216 and the condenser drain flow control valve 212 are closed, and the defrost condensate evaporation feed valve 230 is open and can be modulating. During the defrost cycle, the liquid refrigerant within the evaporator 200' evaporates to form gaseous refrigerant, and the gaseous refrigerant is recovered via the HSS line 232. Furthermore, the defrost condensate evaporation pressure control valve 234 is open and modulating and the refrigeration cycle flow control valve 208 is closed.

One would understand that during the hot gas defrost cycle, the media on the other side of the condenser 204' is heated, and the media on the other side of the evaporator 200' is cooled. The evaporation that occurs during the defrost cycle has an additional effect in that it helps to cool the medium (such as water or water and glycol) in the condensing system which saves electricity because it lowers the discharge pressure of the compressors and reduces the heat exchanger cooling medium flow.

It should be appreciated that the CES could be utilized without the hot gas defrost cycle. The other types of defrost can be utilized with the CES including air defrost, water defrost, or electric defrost. With regard to the schematic representations shown in FIGS. 2-4, one having ordinary skill would understand how the system could be modified to eliminate hot gas defrost and utilizing in its place, air defrost, water defrost, or electric defrost.

The decentralized condenser refrigeration system (DCRS) can advantageously avoid the use of a large centralized condenser or condenser farm. In addition, the DCRS can be characterized as having a centralized compressor and decentralized condensers. The returning gaseous refrigerant can be compressed by the compressor and then sent to the condenser evaporator systems. Exemplary compressor include single stage and multiple stage compressors. Exemplary types of compressor that can be used include reciprocating compressors, screw compressors, rotatory vane compressors, and scroll compressors. In general, the gaseous refrigerant returns to the compressor via the accumulator 122 or 126. Accumulators are generally sized so that the incoming velocity of the gas reduces sufficiently for any liquid refrigerant and entrained in the gaseous refrigerant to dropout so that the liquid is not drawn into the compressor arrangement 102. One or more accumulator or intercooler can be provided. A level monitoring system 92 can be provided to monitor the amount of liquid refrigerant in the accumulator. Excess liquid refrigerant in an accumulator can be removed or evaporated. The level monitoring system 92 is know and can be provided as a float switch or an impedance level rod that monitors the amount of refrigerant in the accumulator. Excess liquid refrigerant in the accumulator can be boiled off using, for example, electric heat, hot gaseous or evaporation via a heat exchanger.

The three prior art systems for conveying liquid from a central condenser to evaporation described above (the liquid pump or liquid overfeed system, the direct expansion system, and the pumper drum system) typically require long runs of pipe that are full of liquid refrigerant (i.e., ammonia) that is pumped from these centralized vessels to each evaporator. These long lines of liquid ammonia can be eliminated by decentralizing the condensers. Alternatively, a condenser can be sized and configured for a corresponding evaporator. Small condensers and controlled pressure receivers can be provided with each evaporator. In order to feed the ammonia to the evaporator, the compressor discharge is piped to the header that feeds each condenser. For illustrative purposes, a 100 foot length of 3 inch pipe filled with −20° F. liquid ammonia that typically runs from a central tank, and is pumped to the various evaporators in an industrial ammonia refrigeration facility holds approximately 208 lbs. of ammonia. In order to provide similar capacity, the system according to the invention would require a 5 inch pipe to provide ammonia to the various CESs, but that pipe would be filled with high pressure gas, not liquid. Therefore, a 100 foot section of 5 inch pipe at 85° F. discharge temperature holds only 7.7 lbs. of ammonia. This results in a 96.3% reduction in ammonia in the main pipe feeding ammonia the plant. Although one not versed in refrigeration might think that this would be insufficient ammonia, it must be noted that the discharge gas is moving at a much faster velocity then the liquid, and it is also important to keep in mind that standard refrigeration systems generally use liquid overfeed, where only 25% of the liquid is actually evaporated, the majority returns to the tank un-evaporated, where it is sent out again.

Accumulator or intercooler vessel diameters may not be reduced in the DCRS compared with the traditional or prior systems described above because the diameters are often chosen based on gas velocity to allow for entrained liquid to be removed from a gas stream. However, in the DCRS, these accumulators or intercoolers can be void or essentially empty of any liquid refrigerant unless the designer or operator decides to use the storage capacity of these vessels as a reservoir for excess refrigerant. In traditional systems, these vessels can normally hold as much as 50% of their capacity in liquid ammonia due to the net positive suction head requirements of traditional ammonia pumps. Therefore, it can be calculated that in a typical 1,000 ton system, the accumulator and intercooler could hold approximately 20,926 lbs. of ammonia if the levels were held at the traditional 50% level. In the DCRS, aside from discretionary storage as described above, the only liquid held in any vessel would be the liquid held in the controlled pressure receiver in each CES. It has been calculated that these vessels during normal operations in a 1,000 ton system would likely hold a combined charge of 953 lbs. of ammonia. This is a reduction of approximately 95%.

Additionally, large centralized evaporative condensers hold 20% of their volume with liquid ammonia. For example, a typical 1,000 refrigeration ton evaporative condenser that is currently sold by a well known evaporative condenser manufacturer has an ammonia charge of approximately 2,122 lbs. of ammonia according to the manufacturer. By using plate and frame heat exchangers in the CES, the total charge of ammonia in the various condensers in a 1,000 ton DCRS system calculates to 124 lbs. This is a reduction in the condensing system of approximately 94%.

The evaporators located in each CES hold approximately 30% of their volume in liquid if the CES is operates as direct expansion, which is the preferred method to reduce the total refrigerant charge in the DCRS. However, the CES can be set up to operate the included evaporator as a flooded, liquid recirculation, or pumper drum type feed for the evaporator. These alternate methods would change the design of the CES to accommodate the method used, but the general concept of condensing the high pressure discharge gas at the CES would not change, thus the basic design of the DCRS system would not change. However if the CES were to be configured for these other methods, the amount of ammonia in each CES would be higher, but would not change the amount of ammonia in the rest of the DCRS system.

Since each industrial refrigeration system is unique to particular refrigeration requirements, it is difficult to compare systems. However, based on the refrigerant charge savings as described, the average reduction of refrigerant charge in the DCRS can be approximately 90%. This is especially important when the refrigerant is ammonia. The Occupational Health and Safety Admiration (OSHA) has classified ammonia as a Highly Hazardous Chemical, and as such has regulated that any refrigeration system with 10,000 lbs. of ammonia be subject to Process Safety Management (PSM) as per standard 29 CFR 1910.119. PSM programs are expensive and complicated. Historically, the ammonia refrigeration industry has not been interested in ammonia charge since ammonia is inexpensive. However, in light of these regulations and because any facility is safer with less ammonia, the ammonia reduction in the DCRS is important. Facilities that use the DCRS as their ammonia refrigeration system will likely have a small enough ammonia charge to stay under the OSHA 10,000 lbs. PSM threshold, in addition to having a safer plant.

Additionally, since the main pipes that run between the various CESs(1) and the accumulator(s) and Intercoolers have so little ammonia, in the event of a catastrophic release due to line break, the amount of ammonia released is obviously greatly reduced. This reduction is not only significant in terms of employee safety, but also important to the surrounding community and environment. Since ammonia is a natural refrigerant with no greenhouse gas consequence and higher efficiency when compared to synthetic HCFCs and other refrigerants, any increase in safety is advantageous.

Construction materials should be generally accepted materials as per ASME (American Society of Mechanical Engineers). ASHRAE (American Society of Heating Refrigerating and Air Conditioning), ANSI (American National Standards Institute), and IIAR (International Institute of Ammonia Refrigeration). The valves, heat exchangers, vessels, controls, pipe, fittings, welding procedures, and other components should conform to those generally accepted standards. A plate and frame style heat exchanger is advantageous for the heat exchanger because a plate and frame heat exchanger generally uses the least amount of refrigerant compared with other types of heat exchangers. It should be appreciated that various heat exchangers can be used including those typically characterized as shell and tube heat exchangers, shell and plate heat exchangers, double pipe and multitube heat exchangers, spiral plate heat exchangers, brazed plate fin heat exchangers, plate fin tube surface heat exchangers, bayonet tube heat exchangers, and spiral tube heat exchangers. A condensing medium can be used in the heat exchanger. The condensing medium can be water or a water solution such as a water and glycol solution or brine, or any cooling medium including carbon dioxide, glycol, or other refrigerants. The evaporator can be any style of evaporator that cools/freezes any material or air.

While it is understood that different industrial refrigeration systems perform differently, we have calculated that a theoretical 1,000 ton system using liquid recirculation as generally characterized for the system shown in FIG. 1 would require approximately 31,500 lbs of ammonia. In contrast, we estimate that a refrigeration system according to the present invention having the same 1,000 ton capacity would require approximately 4,000 lbs of ammonia. This amounts to a reduction of approximately 87%. Depending on a number of factors, including oil cooling, etc., this number can easily exceed 90% reduction in the amount of ammonia.

The above specification provides a complete description of the manufacture and use of the invention. Since many embodiments of the invention can be made without departing from the spirit and scope of the invention, the invention resides in the claims hereinafter appended.

We claim:

1. An industrial refrigeration system constructed to provide refrigeration to multiple locations at the same time, the industrial refrigeration system comprises:
    (a) a centralized compressor arrangement constructed to provide compressed gaseous refrigerant for multiple and separate arrangements of condenser, receiver, and evaporator;
    (b) a gaseous refrigerant feed line for conveying the compressed gaseous refrigerant from the centralized compressor arrangement to the multiple and separate arrangements of compressor, receiver, and evaporator;
    (c) a gaseous refrigerant return line for conveying gaseous refrigerant from the multiple and separate arrangements of condenser, receiver, and evaporator to the centralized compressor arrangement;
    (d) each of the multiple and separate arrangements of condenser, receiver, and evaporator comprises:
        (i) a condenser constructed to condense the compressed gaseous refrigerant to a liquid refrigerant;
        (ii) a receiver for holding the liquid refrigerant;
        (iii) an evaporator for evaporating the liquid refrigerant to the gaseous refrigerant;
        (iv) a first liquid refrigerant feed line for conveying the liquid refrigerant from the condenser to the receiver; and
        (v) a second liquid refrigerant line for conveying the liquid refrigerant from the receiver to the evaporator; and
    (e) wherein the industrial refrigeration system is constructed so that the multiple and separate arrangements of condenser, receiver, and evaporator provide refrigeration to the multiple locations during operation of the industrial refrigeration system.

2. The industrial refrigeration system according to claim 1, wherein the centralized compressor arrangement comprises multiple compressors arranged in series.

3. The industrial refrigeration system according to claim 1, wherein the centralized compressor arrangement comprises an intercooler provided between a first stage compressor and the second stage compressor.

4. The industrial refrigeration system according to claim 1, wherein the evaporators of at least two of the multiple and separate arrangements of condenser, receiver, and evaporator are constructed to operate at different temperatures.

5. The industrial refrigeration system according to claim 4, wherein the different temperatures comprise a difference of at least 10° C.

6. The industrial refrigeration system according to claim 1, wherein the refrigerant comprises ammonia.

7. The industrial refrigeration system according to claim 1, wherein the receiver of at least one of the multiple and separate arrangements of condenser, receiver, and evaporator is constructed to maintain a pressure within the receiver that is less than a condensing pressure of the compressed gaseous refrigerant.

8. The industrial refrigeration system according to claim 1, wherein the compressed gaseous refrigerant is at a pressure greater than 100 psi.

9. The industrial refrigeration system according to claim 1, wherein the condenser of at least one of the multiple and separate arrangements of condenser, receiver, and evaporator comprises a condenser comprises a plate and frame condenser.

10. The industrial refrigeration system according to claim 1, wherein the condenser of at least one of the multiple and separate arrangements of condenser, receiver, and evaporator comprises a shell and tube heat exchanger, a shell and plate heat exchanger, a double pipe heat exchanger, a multitube heat exchanger, a spiral plate heat exchanger, a brazed plate fin heat exchanger, a plate fin tube surface heat exchanger, a bayonet tube heat exchanger, or a spiral tube heat exchanger.

11. The industrial refrigeration system according to claim 1, wherein the gaseous refrigerant feed line conveys the compressed gaseous refrigerant to at least three of the multiple separate arrangements of condenser, controlled pressure receiver, and evaporator.

12. A process for providing refrigeration to multiple locations in a facility, the method:
    (a) compressing gaseous refrigerant to form a compressed gaseous refrigerant using a centralized compressor arrangement;
    (b) feeding the compressed gaseous refrigerant simultaneously to multiple and separate arrangements of compressor, receiver, and evaporator, wherein each of the multiple and separate arrangements of compressor, receiver, and evaporator comprises:
        (1) a condenser for receiving the compressed and gaseous refrigerant and condensing the compressed and gaseous refrigerant to a liquid refrigerant;
        (2) a receiver for holding the liquid refrigerant; and
        (3) an evaporator for evaporating the liquid refrigerant from the receiver to form the gaseous refrigerant; and
    (c) feeding the gaseous refrigerant from the multiple and separate arrangements of condenser, receiver, and evaporator to the centralized compressor arrangement to compress the gaseous refrigerant to form the compressed gaseous refrigerant; and
    wherein the multiple arrangements of condenser, receiver, and evaporator operate at the same time to provide the refrigeration to the facility.

13. The process for providing refrigeration to multiple locations in a facility according to claim 12 wherein:
    (a) the centralized compressor arrangement comprises multiple compressors arranged in series.

14. The process for providing refrigeration to multiple locations in a facility according to claim 12 wherein:
    (a) the centralized compressor arrangement comprises an intercooler provided between a first stage compressor and a second stage compressor.

15. The process for providing refrigeration to multiple locations in a facility according to claim 12, further comprising:
    (a) operating the evaporators of at least two of the multiple and separate arrangements of condenser, receiver, and evaporator at different temperatures.

16. The process for providing refrigeration to multiple locations in a facility according to claim 15 wherein:
    (a) the different temperatures comprise a difference of at least 10° C.

17. The process for providing refrigeration to multiple locations in a facility according to claim 12 wherein:
    (a) the refrigerant comprises ammonia.

18. The process for providing refrigeration to multiple locations in a facility according to claim 12, further comprising:
    (a) driving flow through at least one of the multiple and separate arrangements of condenser, receiver, and evaporator by providing a pressure within the receiver that is less than a condensing pressure of the compressed gaseous refrigerant.

19. The process for providing refrigeration to multiple locations in a facility according to claim 12 wherein:
   (a) the compressed gaseous refrigerant is at a pressure greater than 100 psi.

20. The process for providing refrigeration to multiple locations in a facility according to claim 12 wherein:
   (a) the condenser of at least one of the multiple and separate arrangements of condenser, receiver, and evaporator comprises a condenser comprises a plate and frame condenser.

21. The process for providing refrigeration to multiple locations in a facility according to claim 12 wherein:
   (a) the condenser of at least one of the multiple and separate arrangements of condenser, receiver, and evaporator comprises a shell and tube heat exchanger, a shell and plate heat exchanger, a double pipe heat exchanger, a multitube heat exchanger, a spiral plate heat exchanger, a brazed plate fin heat exchanger, a plate fin tube surface heat exchanger, a bayonet tube heat exchanger, or a spiral tube heat exchanger.

22. The process for providing refrigeration to multiple locations in a facility according to claim 12, further comprising:
   (a) feeding the compressed gaseous refrigerant to at least three of the multiple separate arrangements of condenser, controlled pressure receiver, and evaporator.

* * * * *